3,175,007
PURIFICATION OF DIANILINES
Luther F. Berhenke, Midland, Mich., assignor to The
 Dow Chemical Company, Midland, Mich., a corporation of Delaware
No Drawing. Filed Aug. 14, 1961, Ser. No. 131,118
14 Claims. (Cl. 260—571)

This invention relates to a process for the purification of dianilines. More specifically, it concerns a process for the removal of impurities from compounds having the general structure:

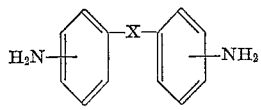

wherein X represents an oxygen atom, a sulfur atom, a carbonyl group or a lower alkylidene radical. These compounds are usually essentially the 4,4'-dianilines.

These dianiline compounds are useful for such purposes as chemical and pharmaceutical intermediates and rubber accelerators, and they are particularly valuable as difunctional compounds for use in the preparation of polymers. They may be prepared in a number of ways, chief among which may be mentioned the ammonolysis of the corresponding dichloro or dibromo compounds and the reduction of the corresponding dinitro compounds. Methylenedianiline is often made by the reaction of aniline and formaldehyde. In such preparations, side reactions occur which result in the formation of colored impurities and monoamines. Impurities having a tarry appearance and separable only with difficulty from the products are often encountered in reactions involving amines. The structures of the colored impurities formed in the preparation of the above dianilines are not known but are thought to be azo compounds, at least in large part. The monofunctional by-products which appear, for example, in the preparation of 4,4'-oxydianiline by the ammonolysis of bis(p-bromophenyl) ether include such compounds as p-phenoxyaniline and p-(p-bromophenoxy)aniline. Another impurity which appears in this preparation is p-(p-aminophenoxy) phenol, a difunctional compound. When oxydianiline is prepared by the reduction of bis(nitrophenyl) ether, the monofunctional impurities similarly include not only phenoxyaniline but also (nitrophenoxy)aniline and (nitrosophenoxy)aniline. Analogous impurities are found in thiodianiline, diaminobenzophenone, and lower alkylidenedianilines prepared by similar reactions. Since the preparations are ordinarily carried out in apparatus which is made at least in part of iron, the products obtained are usually also contaminated with iron. These impurities are removed from the product only with difficulty and even with time-consuming and costly additional processing steps such as distillation or recrystallization, their removal may be far from complete. Particularly difficult is the problem of essentially complete removal of monofunctional by-products which is necessary for the successful use of these dianilines in the preparation of condensation polymers.

The primary object of this invention is the removal of monofunctional by-products from the dianiline compounds previously described.

Additional objects are the removal of colored impurities and the removal of contaminating iron from these dianilines.

A general object of this invention is the production of the dianilines shown as pure and relatively colorless compounds.

My invention resides in the discovery that monofunctional by-products formed in the preparation of dianilines having the general structure:

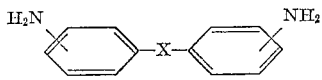

wherein X represents an oxygen atom, a sulfur atom, a carbonyl group or a lower alkylidene radical, may be conveniently and essentially completely removed by a process comprising forming an aqueous solution of a salt of the dianiline with a strong acid, preferably the dianiline dihydrochloride, and extracting this solution with a normally liquid solvent selected from the group consisting of aliphatic ketones containing four to about eight carbon atoms, polychlorinated lower aliphatic hydrocarbons, and aromatic hydrocarbons of the benzene series. Salts of these dianilines which are suitable for use in the process include the dianiline dihydrochloride, the dihydrobromide, and the disulfate. The dihydrochloride is preferred because of its advantageous solubility characteristics.

The dianilines defined by the above general structure include oxydianiline, thiodianiline, carbonyldianiline (better named as diaminobenzophenone), and the lower alkylidenedianilines such as methylenedianiline, ethylidenedianiline, isopropylidenedianiline, propylidenedianiline, butylidenedianiline, isobutylidenedianiline, and (1-methylpropylidene)dianiline.

The extraction is carried out using an aqueous dianiline salt solution in the acid range, preferably having a pH value in the range of about 2.5–3.5. Such a solution is obtained by dissolving a mole of dianiline in a relatively dilute aqueous solution of about 1.9 mole equivalents of a strong acid, the final solution thereby containing about 10–25% by weight of dissolved solids. The extraction becomes less efficient in more strongly acid solutions and at pH levels above about 3.5, the dianiline begins to precipitate from the aqueous solution and more of it appears in the extract.

The temperature at which the extraction is performed is not critical but has the obvious limits imposed by the freezing and boiling temperatures of the solvent employed. It is most conveniently done at or about normal room temperature.

The concentration of the dianiline salt solution and the proportion of solvent used are similarly not critical. Preferably, a dihydrochloride solution concentration lies in the approximate range of 10–25%. The preferable proportion of solvent to salt solution varies inversely with the effectiveness of the particular solvent used.

Solvents which have been found to be useful and effective in the process include chloroform, methylchloroform, ethylene dichloride, toluene, xylene, benzene, methyl ethyl ketone, and methyl isobutyl ketone. Ethylbenzene, mesitylene, methylene chloride, tetrachloroethylene, trichloropropene, diethyl ketone, and methyl hexyl ketone are other operable solvents. Chloroform is particularly effective and is a preferred solvent. Another advantageous solvent is methyl isobutyl ketone.

Some types of solvents have the capability of extracting essentially only the monofunctional impurities from a crude dianiline while others will extract both monofunctional and difunctional impurities. For example, when an acid salt of crude 4,4'-oxydianiline prepared by ammonolysis of bis(p-bromophenyl) ether is extracted with chloroform, the monofunctional by-products p-phenoxyaniline and p-(p-bromophenoxy) aniline are removed essentially completely while the difunctional compound p-(p-aminophenoxy) phenol, which is an unobjectionable impurity for some purposes, is left largely in the product. On the other hand, methyl isobutyl ketone extracts most of the p-(p-aminophenoxy)phenol as well as virtually all of the monofunctional impurities from such a product. The above two solvents are in general typical of their two classes, that is, the polychlorinated lower aliphatic hydrocarbons and the lower aliphatic ketones respectively. The other class of solvents operable in this process, the normally liquid aromatic hydrocarbons, are intermediate between the other two in this respect.

The extraction process may be carried out simply by agitating a mixture of the acid aqueous dianiline salt solution with an effective amount of a solvent such as described above, but for large scale operations the extraction is more efficiently and conveniently accomplished by use of an extraction column wherein the solvent and the aqueous solution are contacted countercurrently. Preferably, the extraction is thereby done in a continuous manner with the solvent extract passing to a recovery still whence recovered solvent is recycled.

Although the solvent extraction step accomplishes the most important part of the purification procedure, that is, the removal of monofunctional impurities from the dianiline product, it is preferably carried out in combination with certain other steps in order to produce a final product which is also essentially free of iron and various colored by-products. For separation of iron from the dianiline product, a reduction process has been found to be particularly effective. By reduction of contaminating iron to the ferrous state, it may then be kept in solution through the final precipitation of the dianiline from its acid salt with ammonia and so removed from the product by filtration. Not only the iron but also colored organic impurities may be reduced and their removal thereby facilitated by the use of a sufficiently powerful reducing agent in the appropriate quantity. The reduction is accomplished simply by dissolving the reducing compound in the dianiline salt solution, using an amount of reducing compound at least equivalent to the amount of iron to be reduced. Where both the contained iron and the colored impurities are to be reduced, the amount of reducing compound to be used is then at least the equivalent to the sum of these. The reduction may be done before or after the solvent extraction step, the order of these steps being immaterial.

Sodium dithionite, sometimes named as the hydrosulfite, has been found to be effective for reducing both iron and colored impurities. Other compounds of like reducing power may be used in its place or in conjunction with it. Reducing agents capable of reducing iron but not the colored impurities include sodium bisulfite and sodium formaldehyde sulfoxylate. These may be used alone where only iron reduction is desired or they may be used in combination with stronger reducing agents. For example, use of an approximately equal amount of sodium bisulfite with sodium dithionite is advantageous in helping to maintain the reducing system by adding some dissolved $SO_2$ to the solution. The reduction process is often accompanied by the formation of a slight precipitate, for example, sulfur when sodium dithionite is used. This precipitate may be removed easily by filtration after the reduction is complete. Although only sodium salts are named as suitable reducing agents, it is to be understood that their obvious equivalents, such as the potassium salts, will work as well.

An optional step in the purification procedure is treatment of the reduced and extracted dianiline salt solution with activated carbon to remove residual color. This may be accomplished conveniently by passing the solution through one or more columns packed with a suitable grade of activated charcoal. In some cases where iron removal from the product is not a problem, activated charcoal may be used as the only color removal means and the reduction step may be eliminated. Ordinarily, however, the quantity of activated charcoal required to do this alone makes this method impractical.

Precipitation of the purified dianiline from a treated salt solution is caused by raising the pH of the solution by addition of a base. Where the solution has been reduced, the precipitation is preferably brought about the addition of ammonia to a final pH of about 5.0–6.0. By keeping the solution at this slightly acid level and out of contact with atmospheric oxygen, the iron present in the solution is maintained in the soluble ferrous state and remains in the filtrate when the precipitated dianiline is separated.

A preferred procedure for the purification, for example, of crude 4,4'-oxydianiline typically containing iron and monofunctional by-products as well as being dark in color from the presence of tarry impurities involves first forming an aqueous solution of the dihydrochloride. This is done by adding about 1.9 moles of concentrated hydrochloric acid to a mole of crude oxydianiline together with sufficient water to make a solution containing about 10–25% of dissolved solids. After stirring, the pH of the solution is adjusted if necessary to about 2.5–3.5 by addition of small amounts of sodium hydroxide or hydrochloric acid and the solution is filtered to remove any undissolved material. To the filtered solution there is added about 1–2 g. of sodium dithionite per pound of crude product plus about an equal amount of sodium bisulfite to improve the stability of the reduced solution. A small flocculent precipitate forms on a few minutes standing, largely sulfur, and this is removed by filtration. The solution at this point is usually yellow in color. It is then countercurrently extracted with chloroform, thereby reducing the monofunctional impurity content below 0.1%. The chloroform extract passes to a recovery still whence the chloroform distillate is recycled to the process. The extracted solution is then passed through one or more columns packed with activated charcoal to remove residual color and flows from there into a nitrogen blanketed precipitating vessel. Here aqueous ammonia is added in approximately the stoichiometrically equivalent quantity required to neutralize the dihydrochloride, the final pH of the mixture being held to 5.0–6.0 to prevent precipitation of iron. The precipitated solid is then filtered, water washed, and dried to yield about 80–85% of 4,4'-oxydianiline based on the weight of the original crude product as an off-white or cream colored solid of better than 98% purity and containing about 50–100 parts per million of iron and typically less than 0.05% of p-phenoxyaniline and other monofunctional compounds.

The following examples illustrate variations in the application of my purification process.

EXAMPLE 1

A sample of 25 g. of crude 4,4'-oxydianiline containing about 0.7% p-phenoxyaniline, 4% p-(p-aminophenoxy) phenol, and 1% iron was dissolved in 43 ml. of 5 N HCl plus 100 ml. of water, giving a solution of pH 3. The solution was filtered and the small filter cake was washed with a little water to give a combined dark colored filtrate of 220 ml. volume. This solution was extracted with four successive 25 ml. portions of chloroform. After the second, third, and fourth of these extractions, samples were taken of the water layer and the 4,4'-oxydianiline contents were recovered by neutralization with ammonia to a pH of about 5–6. The recovered 4,4'-oxydianiline samples taken after the second, third, and fourth extractions analyzed 0.05%, 0.02%, and less than 0.01% p-phenoxyaniline respectively by mass spectroscopy. The final raffinate was treated with activated charcoal and neutralized as described above to yield cream colored crystals containing about 300 p.p.m. of iron. The total recovery of 4,4'-oxydianiline was 20 g. or 80% of the original crude.

EXAMPLE 2

Ten grams of the crude 4,4'-oxydianiline used in Example 1 was similarly dissolved in dilute hydrochloric acid and the solution was filtered. About 0.05 g. of sodium dithionite was added, changing the color of the solution from dark red to light straw. The solution was then extracted three times with portions of a tenth its volume of methyl isobutyl ketone. The raffinate was shaken with 0.5 g. of activated carbon, filtered, and 4,4'-oxydianiline precipitated by neutralizing the solution to pH 5 with aqueous ammonia.

The above procedure was repeated twice using toluene and tetrachloroethylene respectively as the extraction solvents in place of methyl isobutyl ketone. Properties of the three products obtained are listed in Table I. Analyses were by mass spectroscopy.

*Table I*

| Solvent Used | MIBK | Toluene | C₂Cl₄ |
|---|---|---|---|
| Percent p-phenoxyaniline in product | 0.03 | 0.06 | 0.3 |
| Percent p-(p-aminophenoxy)phenol in product | ca. 1.2 | ca. 2.5 | ca. 4.0 |

EXAMPLE 3

Some partially purified 4,4'-oxydianiline contained 0.03% p-phenoxyaniline, 0.3% iron and a 1% solution in 0.1 N HCl had a APHA color of 860. It was divided into nine portions of 5.5 lbs. each and each portion was dissolved in a solution of 5 lbs. of 36% hydrochloric acid in 22 lbs. of water to give a solution of pH 3.0–3.3. To each a solution of 5 g. of sodium dithionite and 5 g. of sodium bisulfite was added, changing the color from dark red to a light straw. This feed solution was pumped into a continuous precipitation vessel where it was neutralized under a nitrogen blanket to pH 5.0–5.2 with aqueous ammonia. The precipitated 4,4'-oxydianiline was recovered by filtration and was washed and dried. Total recovery from the nine portions was 48.5 lbs. or 98% of that charged. The purified product contained 70 p.p.m. of iron and a 1% solution in 0.1 N HCl had an APHA color of 150.

By the procedures described above, thiodianiline, diaminobenzophenone, methylenedianiline, ethylidenedianiline, isopropylidenedianiline, propylidenedianiline, butylidenedianiline, isobutylidenedianiline, and (1-methyl-propylidene) dianiline may also be treated to give like yields of similarly purified products.

I claim:

1. A process for purifying a dianiline compound having the structure

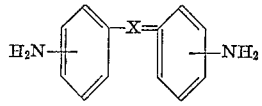

wherein X is selected from the group consisting of an oxygen atom, a sulfur atom, a carbonyl group, and a lower alkylidene radical, which process comprises forming an acid aqueous solution of a salt of the dianiline with a strong acid, said solution having a pH of about 2.5–3.5, and extracting said solution by contacting it with a normally liquid solvent selected from the group consisting of aliphatic ketones containing four to about eight carbon atoms, polychlorinated lower aliphatic hydrocarbons, and aromatic hydrocarbons of the benzene series.

2. A process as described in claim 1 wherein the dianiline compound contains ferric iron as an impurity and there is added to the dianiline salt solution a reducing agent at least sufficient to reduce essentially all contained ferric iron to the ferrous state.

3. A process as described in claim 1 wherein the extracting solvent is chloroform.

4. A process as described in claim 1 wherein the extracting solvent is methyl isobutyl ketone.

5. A process as described in claim 2 wherein the reducing agent comprises sodium dithionite.

6. A process for purifying a dianiline compound having the structure

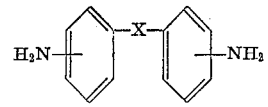

wherein X is selected from the group consisting of an oxygen atom, a sulfur atom, a carbonyl group, and a lower alkylidene radical, said dianiline compound containing ferric iron as an impurity, which process comprises the steps of forming an acid aqueous solution of a salt of the dianiline with a strong acid; adding to said solution a reducing agent at least sufficient to reduce all contained ferric iron to the ferrous state; extracting said solution at a pH of about 2.5–3.5 by contacting it with a normally liquid solvent selected from the group consisting of aliphatic ketones containing four to eight carbon atoms, polychlorinated lower aliphatic hydrocarbons, and aromatic hydrocarbons of the benzene series; the relative order of the latter two steps being immaterial, adding ammonia to the reduced and extracted solution to a final pH of about 5.0–6.0 while maintaining said solution out of contact with atmospheric oxygen; and recovering the thereby precipitated dianiline.

7. A process for purifying oxydianiline which comprises forming an acid aqueous solution of a salt of oxydianiline with a strong acid, said solution having a pH of about 2.5–3.5, and extracting said solution by contacting it with a normally liquid solvent selected from the group consisting of aliphatic ketones containing four to about eight carbon atoms, polychlorinated lower aliphatic hydrocarbons, and aromatic hydrocarbons of the benzene series.

8. A process as described in claim 7 wherein the oxydianiline contains ferric iron as an impurity and there is added to the oxydianiline salt solution a reducing agent at least sufficient to reduce essentially all contained ferric iron to the ferrous state.

9. A process as described in claim 7 wherein the extracting solvent is chloroform.

10. A process as described in claim 7 wherein the extracting solvent is methyl isobutyl ketone.

11. A process as described in claim 8 wherein the reducing agent comprises sodium dithionite.

12. A process for purifying oxydianiline, said oxydianiline containing ferric iron as an impurity, which comprises forming an acid aqueous solution of a salt of oxydianiline with a strong acid, said solution having a pH of about 2.5–3.5, adding to said solution a reducing agent at least sufficient to reduce all contained ferric iron to the ferrous state, extracting said solution by contacting it with a normally liquid solvent selected from the group consisting of aliphatic ketones containing four to about eight carbon atoms, polychlorinated lower aliphatic hydrocarbons, and aromatic hydrocarbons of the benzene series, the relative order of the latter two steps being immaterial, adding ammonia to the reduced and extracted solution to a final pH of about 5.0–6.0 while maintaining said solution out of contact with atmospheric oxygen, and recovering the thereby precipitated oxydianiline.

13. A process for purifying 4,4'-oxydianiline, said 4,4'-oxydianiline containing ferric iron as an impurity, which comprises forming an aqueous solution of 4,4'-oxydianiline dihydrochloride, said solution having a pH of about 2.5–3.5 and containing about 10–25% of dissolved solids, adding to said solution an amount of sodium dithionite sufficient to reduce all contained ferric iron to the ferrous state, extracting said solution by contacting it with chloroform, the relative order of the latter two steps being immaterial, adding ammonia to the reduced and extracted solution to a final pH of about 5.0–6.0 while maintaining said solution out of contact with atmospheric oxygen, and recovering the thereby precipitated 4,4'-oxydianiline.

14. A process for purifying 4,4'-oxydianiline containing p-phenoxyaniline as a principal impurity, which process comprises forming an aqueous solution of said 4,4'-oxydianiline as its dihydrochloride, said solution having a pH of about 2.5–3.5 and containing about 10–25% by weight of dissolved solids, contacting said solution with chloroform, thereby extracting p-phenoxyaniline from said solution, adding ammonia to the extracted aqueous solution to a final pH of about 5.0–6.0 while maintaining said solution out of contact with atmospheric oxygen, and recovering the thereby precipitated 4,4'-oxydianiline.

References Cited in the file of this patent

UNITED STATES PATENTS

| | | |
|---|---|---|
| 2,385,504 | Goulding | Sept. 25, 1945 |
| 2,765,341 | Wirth et al. | Oct. 2, 1956 |
| 2,996,546 | Sayigh | Aug. 15, 1961 |

FOREIGN PATENTS

| | | |
|---|---|---|
| 141,440 | Great Britain | Apr. 19, 1920 |

OTHER REFERENCES

Reynolds, J.A.C.S. 73, 4996 (1951).